Oct. 25, 1932.　　A. KINDELMANN ET AL　　1,884,733
LENS SHIFTING DEVICE
Filed Jan. 6, 1931　　4 Sheets-Sheet 2

INVENTORS
Albert Kindelmann.
Ewald Boecking.
BY their ATTORNEYS

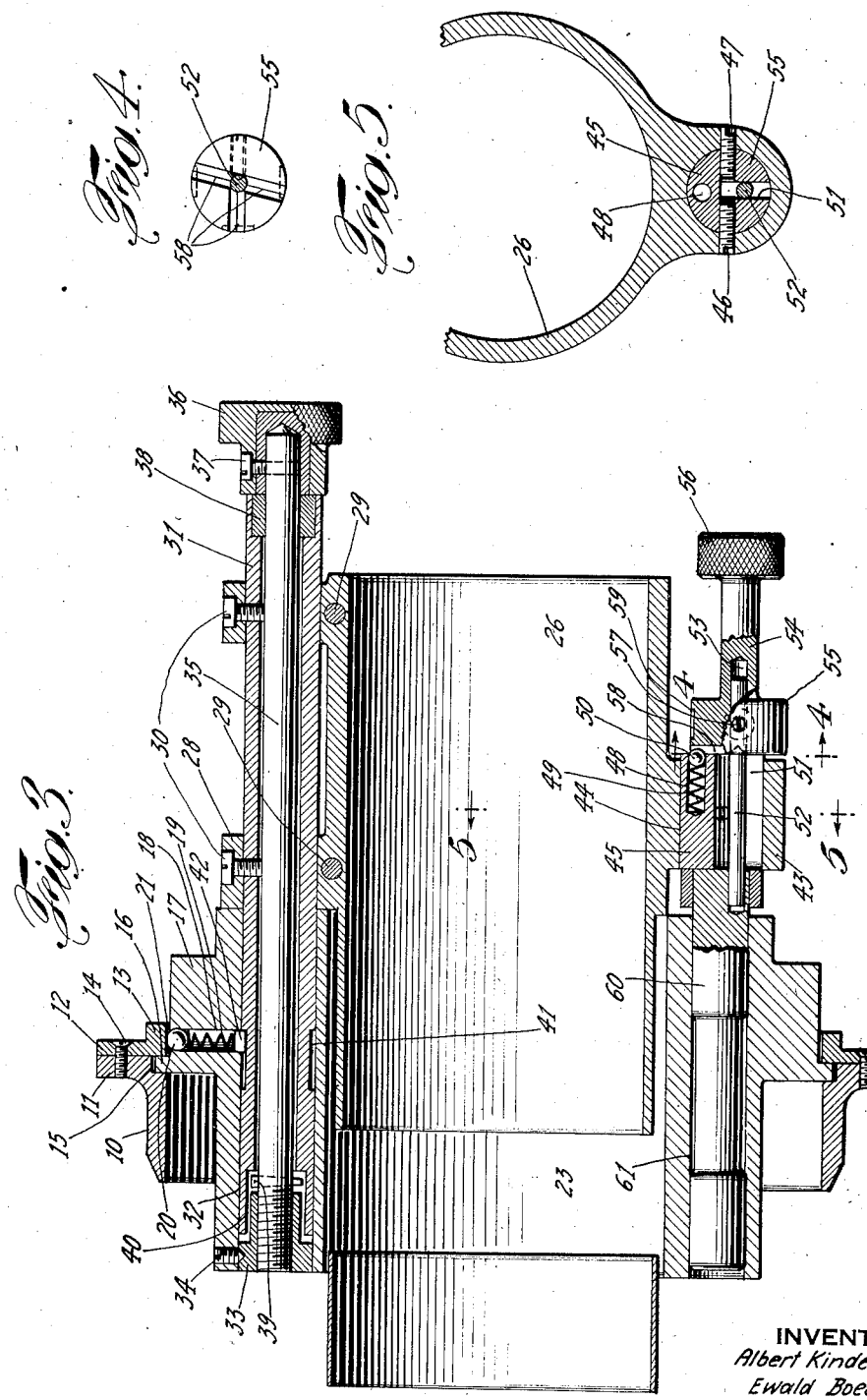

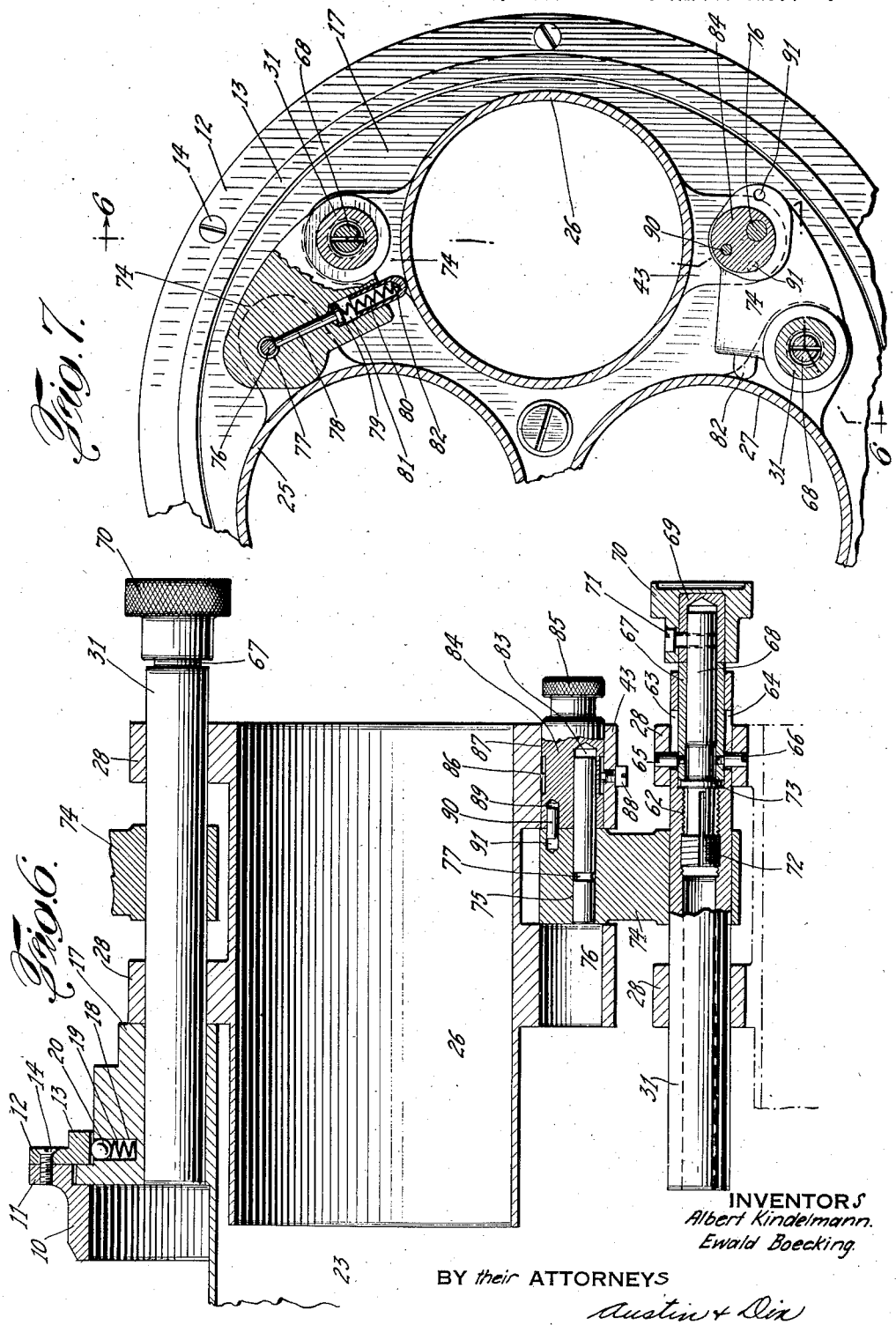

Patented Oct. 25, 1932

1,884,733

UNITED STATES PATENT OFFICE

ALBERT KINDELMANN, OF FLORAL PARK, AND EWALD BOECKING, OF BROOKLYN, NEW YORK, ASSIGNORS TO INTERNATIONAL PROJECTOR CORPORATION, OF NEW YORK, N. Y., A CORPORATION OF DELAWARE

LENS SHIFTING DEVICE

Application filed January 6, 1931. Serial No. 506,905.

This invention relates to new and useful improvements in motion picture apparatus with special reference to improvements in lens supporting turrets of motion picture projectors and has particular relation to an improved means whereby any one of a plurality of lenses on the turret can be shifted to align the lens axis with one or more optical axes.

The main object of the invention is to provide a simple, compact, rugged, readily operable device for shifting the lens or lens mounts in a quick and accurate manner so that the operator can adapt his machine for use with ordinary film, movietone film, grandeur film, or vitaphone film, without any material difficulty or interruption to the operation of the projector.

Another object is to provide a simple, compact mechanism which will stand continuous hard usage over a long period of time with a minimum amount of repairs and replacements.

A still further object is to provide simple and efficient means whereby the shifting mechanism is securely latched in any one of several positions and whereby the position of the lens or lens mount is at any given time clearly apparent to the operator.

A still further object is to provide a simple and efficient means whereby the shifting mechanism after it has been moved to align a new lens with the optical axis can be slightly moved to adjust this lens with the desired axis.

Further and more specific objects, features and advantages will more clearly appear from a consideration of the specification hereinafter taken in connection with the accompanying drawings which form part of the specification and will illustrate a present preferred form of the invention.

Considered in the main general terms, the invention comprises a turret having several lens mounts thereon which are separately capable of being moved longitudinally for focusing the lens and at the same time or at different times capable of shifting laterally to align the axis of each lens with the center of one or more different types of films which may be used in the projector. Generally speaking, the shifting device comprises a rotatable member on the turret to which an operating handle or element is eccentrically connected and this operating element is engaged with a portion of the lens mount preferably at a maximum distance from the pivotal axis so that upon rotation of the operating element, the lens mount is shifted. The mount and the operating element are provided with cooperating latching means so that in predetermined positions of the operating element, the element is latched.

The operating element is also combined with associated indicating means so that automatically as it is moved from one position to another, the desired indicator is disposed properly to view, so that the operator or the person actuating the device can instantly perceive the position of the lens with respect to the desired axis. This it will be understood, is highly important when the machine is adapted to project several different types of film, as above mentioned. Therefore, with any given film, the operator merely turns the operating element until indication for that type of film has been moved into position, whereupon he knows with certainty that the lens is aligned axially for that type of film. The general axial direction of the operating element and the rotatable member disposed in the turret to which it is eccentrically connected is longitudinal of the machine and substantially parallel to the pivotal axis of the lens mount, whereby a rather simple construction is provided. Furthermore, the operating element projects from the front of the lens mount in a longitudinal direction in the same manner as does the operating element or handle of the lens focusing device. This lens focusing device is also intimately associated with the axis on which the mount is pivoted for lateral movement. In fact, the lens mount is supported on a sleeve disposed in a longitudinal bore in the turret and this sleeve is capable of being slid within the bore and suitable means are provided whereby upon turning of the focusing knob the lens mount supporting sleeve will be moved into or out of the bore the desired distance for focusing. Therefore, the same element which is movable for fastening the mount also acts as a support for the mount in its lateral pivotal movement.

The shifting and focusing means, therefore, are both cooperative in their arrangement and construction to provide a simple and efficient mechanism.

A present preferred form of the invention is illustrated in the drawings, in which:

Fig. 3 is a vertical section taken on line 3—3 of Fig. 2;

Fig. 4 is a cross section taken on the line 4—4 of Fig. 3;

Fig. 5 is a cross section taken on line 5—5 of Fig. 3;

Fig. 6 is a vertical section taken on line 6—6 of Fig. 7; and

Fig. 7 is a front elevational view with certain portions in section of a modified form of the invention.

Figure 1:
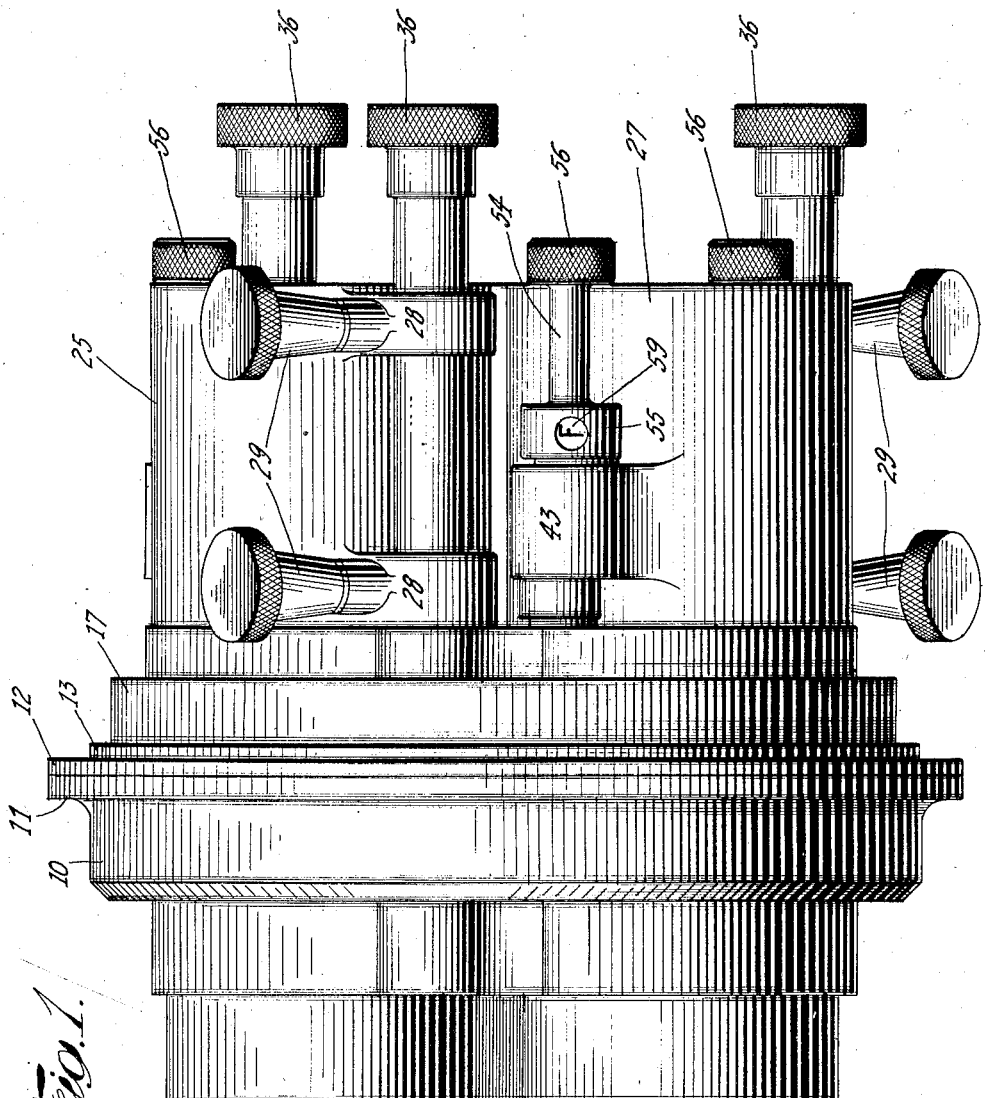
Fig. 1 is a side elevational view of the lens turret.

As shown in the drawings the present preferred forms of the invention comprise a ring 10 having an upwardly extending flange 11 to which is attached an auxiliary ring 12. The ring 12 is fastened to flange 11 by means of a screw 14. Between their inner adjacent faces there is formed between these two rings 11 and 12 a groove 15. These two rings may be attached to or fastened in any suitable part of the frame of a motion picture projector or they may be formed integral with the frame instead of being supported therefrom.

Into the groove 15, Fig. 3, projects a peripheral rib or flange 16 formed on the circumferential periphery of a turret casing 17. This turret member is adapted to be rotated or turned within the ring 10 and has several spaced radial bores such as 18 therein in each of which is disposed a spring 19 bearing against a ball 20. This ball in each case is adapted to cooperate with a notch such as 21 in the inner face of the flange 13 on the auxiliary ring 12. There are a plurality of these bores, balls, and notches so that as the turret member 17 is rotated within the supporting ring 10 it is temporarily latched in any one of several positions and the latched condition of the turret in these positions is indicated to the operator by reason of the resistance offered to turning the turret from any one of these positions.

Figure 2:
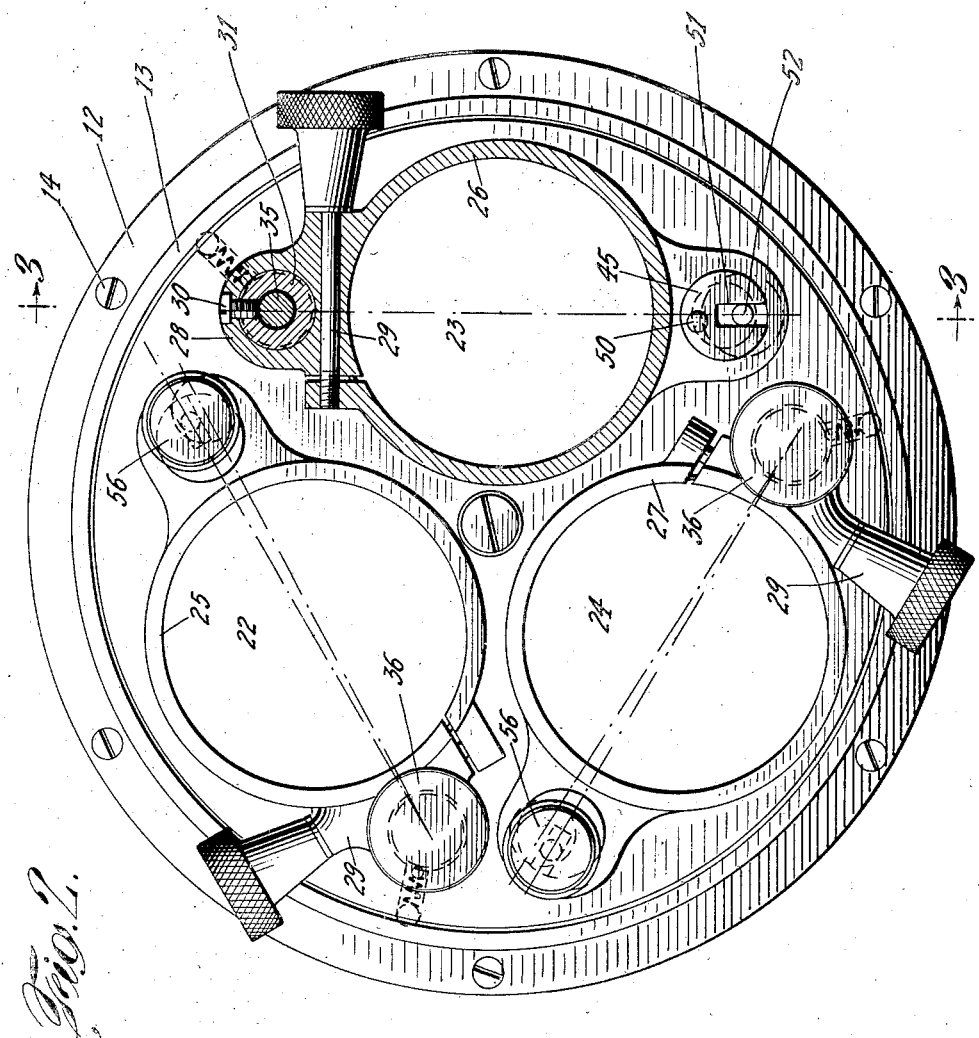
Fig. 2 is a front elevational view with a portion broken away.

As shown in Figs. 1 and 2 particularly, the turret member 17 is provided with a plurality of longitudinal openings therethrough such as 22, 23 and 24, through which the projection light of the apparatus is adapted to pass after and when that particular opening is aligned with the projection axis by turning of the turret 17. In these through openings of the turret are disposed lens mounts or rings which are provided on their upper surface with spaced ears such as 28, and are also provided with the usual clamping screws 29, since each of the mounts or rings is split in the usual manner in order to permit the screws 29 to tighten the rings upon the lens which may be inserted there-within.

Each of the lens mounts 25, 26 and 27 which is provided with ears 28 is connected by means of screw 30 with a sleeve 31. This sleeve 31 extends parallel to the axis of and above its respective lens mount and extends into a bore such as 32, Fig. 3, in the turret member 17. At one end of this bore 32 there is fixed a threaded plug 33 by means of set screw 34. Extending into the plug 33 is a threaded end of a shaft 35 which extends through and within the sleeve 31 and projects between the opposite end of said sleeve. To the opposite end of this shaft 35 is fastened an operating knob 36 by means of screw 37. Disposed between the knob 36 and within the adjacent end of the sleeve 31 is a plug 38. Fastened to and projecting from the shaft 35 adjacent the inner end of the plug 33 is a key 39. This key is disposed in a recess 40 formed in the adjacent end of the sleeve 31.

The sleeve 31 within the bore 32 is provided with a peripheral groove 41 of considerable length and in this groove there is adapted to slide a block 42 against which the lower end of the spring 19 is adapted to bear.

Each of the lens rings or mounts 25, 26 and 27 are provided on their lower portions with a downwardly projecting ear 43 provided with a bore 44. In this ear there is fixedly disposed a block 45. This fixation is produced by set screws 46 and 47 extending into the holes of the block from opposite sides of the ear 43 as shown particularly in Fig. 5. This block 45 is provided with a longitudinal bore 48 in which is disposed a spring 49 and a ball 50. The block is also formed with a longitudinal rather deep groove 51 cut thereinto from the lower face thereof. Through this groove 51 there extends a pin or stub shaft 52. The outer end of this stub shaft 52 is received in a bore 53 in an operating element 54. This element is adjacent the nearest face of the ear 43. A round head 55 has at its opposite end a thumb knob 56. The element is fastened to the stub shaft 52 by means of a set screw 57. The face of the head 55 adjacent ear 43 is provided with a plurality of notches such as 58, three in number in the form shown, and on its periphery is provided with a smaller number of recesses 59 in which are disposed suitable indicia, as is shown in Fig. 1.

Into the notches 58 the ball 50 will project when the notches are aligned with it to automatically latch the operating element 54 in any one of several positions.

The opposite end of the stub shaft 52 eccentrically extends into an elongated rod or shaft 60 which is snugly disposed in a bore 61 in the lower portion of the turret member 17 beneath a respective one of the light openings 22, 23 and 24. The shaft 60 while snugly fitting within the bore 61 can slide and turn therein. This turning, therefore, when the thumb knob 56 is turned the eccentricity of the pin 52 and the shaft 60 and its snug housing within the groove 51 will cause the ear 43 to be shifted laterally in one or another position depending upon the movement of the knob 56. The latter movement of the ear will shift the corresponding lens mount around the axis of the sleeve 31 to which it is attached. This sleeve 31 in each case being turned within the bore 32.

The turning of the knob 36 fastened to shaft 35 will cause the shaft 35 to be moved longitudinally in one direction or another and the key 39 on the plug 38 will bear against the sleeve 31 to move it in one direction. The plug 38 adjacent the notch 36 will contact with the sleeve 31 to move it in the opposite direction. The fact that the ears 28 are fastened to the sleeve 31 and support the respective lens mounts will cause the lens mounts to be moved longitudinally a desired distance for focusing the lenses. The longitudinal movement of the sleeve 31 does not affect the disposition of the block 42 because this block rides in the groove 41 which allows for such movement.

Turning the knob 56 to any one of several positions wherein the element 54 is latched by cooperation between ball 50 and notches 58 will so shift the lens mount as to align its axis with the respective axis or centers of different kinds of film such as a standard or normal film, a movietone film, a grandeur film, or vitaphone film, the sections of each of which have centers slightly different from each other. The eccentric shifting mechanism above described is so designed as to its eccentricity, that by moving it the lateral shifting of the lens is achieved to shift the lens in each instance, a desired amount to align it with its new axial position. The indicia disposed in the recesses 59 are placed on the operating element in such position that when the operating element is moved to bring the indicia to a definite position, it is then established with certainty that the lens mount is axially aligned with the center of the film of the type represented by the indicia presented. In this manner, therefore, the operator merely turns the shifting element, when a predetermined film is in the machine, until the corresponding indicia has been moved to the proper position, whereupon he knows that the lens mount is properly aligned for that type of film.

In the operation of the device as far as the turret itself is concerned, the operator merely grasps the turret in his hand and moves it to such a position so that the desired lens is in alignment with the projection axis, the lens desired will depend upon the type of film being used and when the lens has reached the proper aligned positions the balls 20 cooperating with the notches 21 will hold the turret in this position. The focusing of the mounts and the shifting thereof, it will be apparent are achieved merely by turning the two knobs 36 and 56.

In Figs. 6 and 7 there is shown a modified form of the invention with particular reference to its relation to the turret light opening 23 and the associated lens mount 26. The parts of this modified form which are common to those previously described are similarly numbered. In this form the sleeve 31 is journalled in the ears 28, but is not fastened thereto. This sleeve has within it a partial threaded bore 62 and near one end oppositely disposed slots 63 and 64. Pins 65 and 66 extend from one of the ears 28 through the slots into an auxiliary sleeve 67 disposed within one end of the sleeve 31. Within this sleeve 67 there is disposed an operating shaft 68 which at its upward end is received in a cup-shaped plug 69 around which an operating thumb knob 70 is disposed. A screw 71 connects the knob 70 and the end of shaft 68. The opposite end of the shaft 67 has at 72 to engage with the threads in the bore 62 an intermediate shaft having a disk-like flange 73 adapted to bear against the inner end of the sleeve 67. It will be apparent that by turning the knob 70, the sleeve 31 will be moved to the right or left depending upon the direction of movement of knob 70 and will thereby permit the lens within the mount 26 to be focused.

Intermediate the ear 28 and mounted loosely on the sleeve 31 is a block 74, one end of which extends adjacent the ear 43 and the adjacent lens mount, this block is provided with a bore 75 in which is disposed a shaft 76, this shaft within the block 74 has a peripheral groove 77. Into this groove projects the end of a pin 78, see Fig. 7. This pin has at its desired end a head 79 pressed by a spring 80 disposed in a bore 81 in the block. The other end of the spring 80 is received in a slidable cup-shaped element 82, the upward end of which bears resiliently against the surface of the adjacent lens mount. The construction enables the shaft 76 to be held in position within the block 74.

The shaft 76 extends laterally of the block 74 into a bore 83, in the rotatable plug 84, housed in the ear 43 and provided with a thumb knob 85. The bore 83 is disposed eccentrically of the plug 84. This plug is provided with a peripheral groove 86 of sufficient length to permit longitudinal movement of the plug in the bore 87 of the ear 43 and into this groove there projects a set screw 88 mounted on the ear 43. The plug 84 is also provided with a small bore 89 in which is disposed a small latch pin 90. This latch pin is adapted to partly project into one of several bores such as 91 disposed in the adjacent face of the block 74. It will be apparent that the eccentricity of the bore 83 receiving the shaft 76 will act, when the knob 85 is turned to shift the lower end of the lens mount 26 in one direction or another. In order to shift this mount 26, the knob 85 is pulled out sufficiently to clear the pin 90 from one of the bores 91, whereupon the knob is turned to achieve the desired amount of lateral movement. When the desired position is reached bore 91 is in alignment and the knob can be pushed back into place whereby the pin 90 will enter the proper bore 91 and latch the shifting mechanism.

It is, therefore, apparent that this invention has provided a simple, efficient, rugged construction whereby by the turning of a simple knob to any one of a plurality of definitely indicated positions, the lens mount associated with the operation of such knob can be moved accurately and easily to any one of a plurality of axial positions so that the lens mount may be selectively aligned with the centers of several types of film mentioned herein. This enables the one machine not only to be adapted to use any one of several types of lens but also to enable each lens to be readily aligned with any one of several types of film adaptable for use within this machine.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In a motion picture apparatus a frame, a support therein, a turret disposed in said support, a lens mount disposed on said turret, a longitudinally disposed element on said turret for supporting said lens mount, said element being slidable and turnable in said turret, means for adjusting said element longitudinally to focus the lenses, and an eccentrically mounted operating means disposed longitudinally in the turret and engaging with a portion of the lens mount to shift the same laterally.

2. In a motion picture apparatus a frame, a support therein, a turret disposed within said support, a lens mount disposed on said turret, a longitudinally disposed element on said turret for supporting said lens mount, a longitudinally disposed element on the turret associated with the lens mount, and means eccentrically associating said last mentioned element with the lens mount to shift the lens mount laterally.

3. In a motion picture apparatus a frame, a supporting ring therein, a rotatable turret disposed in said ring, a lens mount disposed on said turret, a longitudinally disposed element on said turret for supporting said lens mount, said element being slidable and turnable in said turret, means for adjusting said element longitudinally to focus the lenses, and an eccentrically mounted operating means disposed longitudinally in the turret and engaging with the lower portion of the lens mount to shift the same laterally.

4. In a motion picture apparatus a frame, a supporting ring therein, a rotatable turret disposed within said ring, a lens mount disposed in said turret, a longitudinally disposed element in said turret for supporting said lens mount and a longitudinally disposed element on the turret at the bottom of the lens mount to shift the same laterally.

5. In a motion picture apparatus, a frame, a supporting ring therein, a rotatable turret disposed within said ring, a sleeve longitudinally supported within the turret, an adjusting shaft threadedly engaging and disposed within said sleeve, an auxiliary sleeve disposed within said sleeve and connected positively to said mount and means on the adjusting shaft to engage said auxiliary sleeve to move the lens mount in one direction or another as the adjacent shaft is turned.

6. In a motion picture apparatus, a frame, a supporting ring therein, a rotatable turret disposed within said ring, a lens mounted on said turret, a supporting sleeve disposed longitudinally on the turret and supporting said mount, an adjusting shaft longitudinally disposed within said sleeve and threadably engaging therewith, an auxiliary sleeve disposed within the supporting sleeve around a portion of the adjusting shaft, pin means connecting the said auxiliary sleeve with a portion of said mount and shoulders formed in association and movable with the adjusting shaft to engage said auxiliary sleeve to move the same on the mount in one direction or another when the adjusting shaft is turned.

7. In a motion picture apparatus, a frame, a supporting ring therein, a rotatable turret disposed within said ring, a lens mount pivotally supported on the turret for longitudinal and lateral movement, means disposed in fixed position in association with the turret adjacent the lower portion of each mount, a rotatable shifting element disposed on each mount and eccentrically connected to the said last mentioned means whereby the turning of said shifting element due to its eccentricity will shift the mount laterally.

8. In motion picture apparatus, a frame, a supporting ring therein, a rotatable turret disposed in said ring, a lens mount pivotally supported on said turret for longitudinal and lateral movement, a block disposed in fixed relation to the lower portion of said mount, an ear on the lower portion of said mount adjacent said block, a rotatable plug in said ear and having an eccentric bore, a pin extending into said bore from said block whereby the rotation of said plug due to its eccentricity will shift the mount laterally.

9. In motion picture apparatus, a frame, a supporting ring therein, a rotatable turret disposed in said ring, a lens mount pivotally supported on said turret for longitudinal and lateral movement, a block disposed in fixed relation to the lower portion of said mount, an ear on the lower portion of said mount adjacent said block, a rotatable plug in said ear and having an eccentric bore, a pin extending into said bore from said block whereby the rotation of said plug due to its eccentricity will shift the mount laterally, and cooperating means on the block and plug to latch the plug in any one of several positions.

10. In motion picture apparatus, a frame, a supporting ring therein, a rotatable turret disposed in said ring, a lens mount pivotally supported on said turret for longitudinal and lateral movement, a block disposed in fixed relation to the lower portion of said mount, an ear on the lower portion of said mount adjacent said block, a rotatable plug in said ear and having an eccentric bore, a pin extending into said bore from said block whereby the rotation of said plug due to its eccentricity will shift the mount laterally, said pin having a groove therein within the plug and a spring pressed latch pin within the block engaging in said groove to hold said pin in position.

11. In a motion picture apparatus, a frame, a supporting ring therein, a rotatable turret disposed within said ring, a plurality of lens mounts on said turret pivotally supported for longitudinal and lateral movement, a supporting sleeve disposed longitudinally in the turret and engaging with the upper portion of each mount to support the same, a block embracing a portion of each sleeve and extending adjacent to the lower portion of the adjacent mount, each mount having an ear adjacent each block, a rotatable plug in the bore of each ear, a bore eccentrically disposed in each plug, a pin on the block extending into the eccentric bore, said pin having a peripheral groove therein within the block, a spring pressed rod slidably disposed in a bore in the plug and engageable in said groove to hold the pin in position, said block and plug having cooperating recesses, a latch member on the plug adapted to be disposed in one or another of the recesses in the block to latch the plug in any one of several positions, the plug being longitudinally movable with respect to the ear on the pin to withdraw the latch member from the recesses whereby the plug can be moved to a new position to shift the mount to a new position laterally.

In testimony whereof we have hereunto set our hands.

ALBERT KINDELMANN.
EWALD BOECKING.